May 31, 1932.    W. C. YEAKEL    1,860,973
COUPLER
Filed Sept. 20, 1929    2 Sheets-Sheet 1
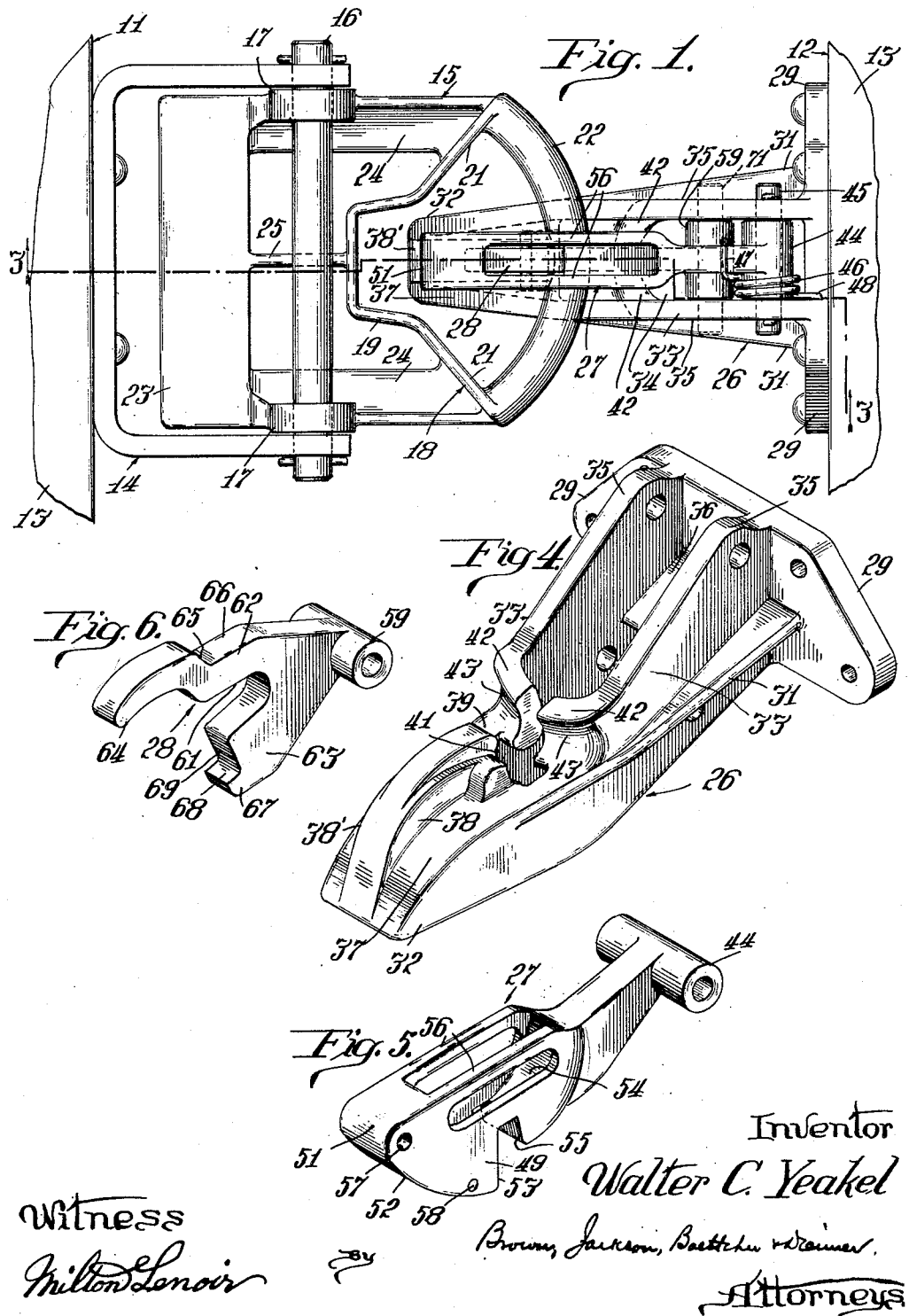

May 31, 1932.  W. C. YEAKEL  1,860,973
COUPLER
Filed Sept. 20, 1929  2 Sheets-Sheet 2
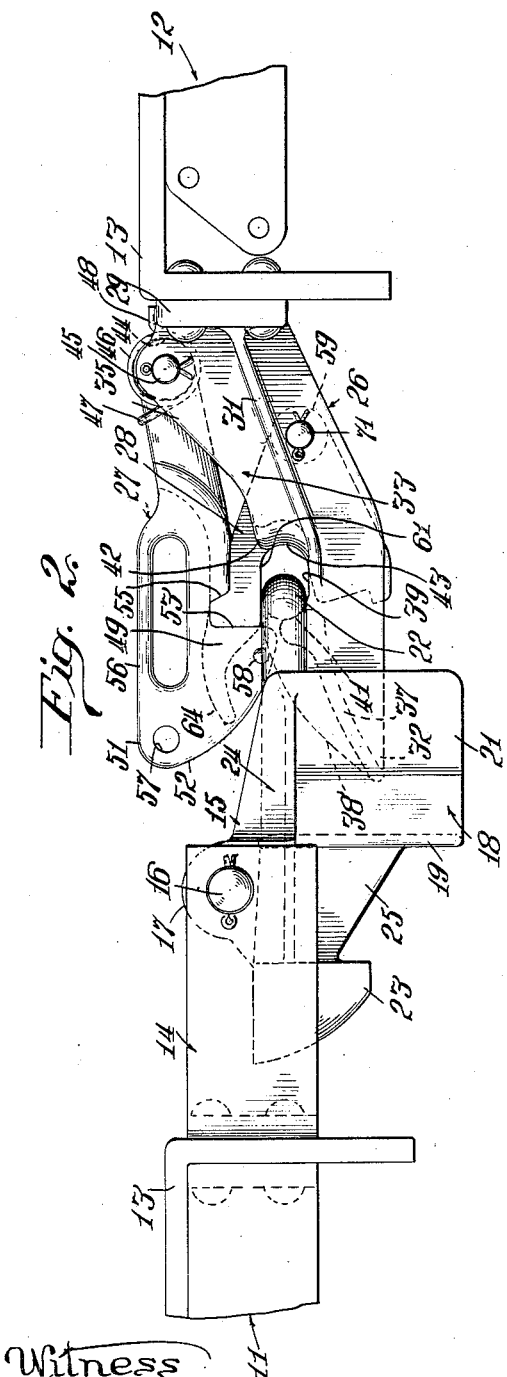
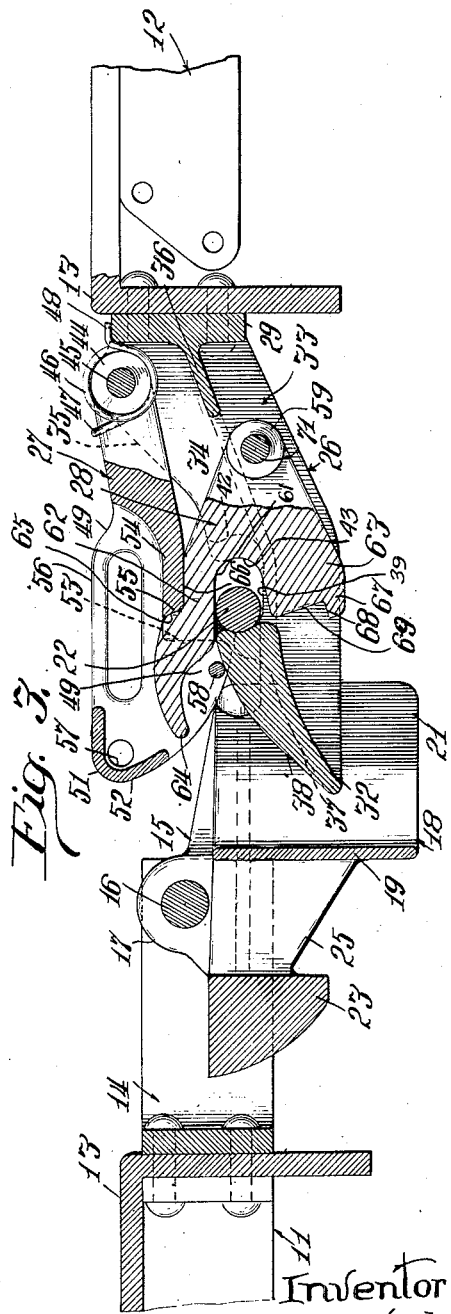
Inventor
Walter C. Yeakel Patented May 31, 1932

1,860,973

UNITED STATES PATENT OFFICE

WALTER C. YEAKEL, OF BATTLE CREEK, MICHIGAN, ASSIGNOR TO CLARK TRUC-TRACTOR COMPANY, OF BUCHANAN, MICHIGAN, A CORPORATION OF MICHIGAN

COUPLER

Application filed September 20, 1929. Serial No. 393,981.

This invention relates to coupling devices and more particularly to a coupler adapted for use in coupling together a drawing vehicle and a drawn vehicle such as a tractor and a trailer or two or more trailers to form a train.

The instant invention may be characterized as an improvement upon the device disclosed in the co-pending application of Alfred O. Williams, for Coupler, Serial No. 345,296, filed March 8, 1929.

The device disclosed in the above noted application comprises a coupling means in which a draw bar is rigidly secured to the platform of a trailer and is adapted to be engaged by an apron or guide member on a drawing vehicle, the apron being free for vertical movement in accordance with such movement of the trailer, thus preventing a breakage of the apron due to the relative vertical movement between the drawing vehicle and the drawn vehicle. The coupling element of the apron is formed as an integral part of the apron structure, and the coacting parts are so associated that they permit a large amount of relative movement therebetween without permitting uncoupling of the parts and at the same time preventing excessive lateral movement of the draw bar.

In accordance with the instant invention, a novel draw bar is provided for co-action with an apron of the type disclosed in the above identified application, in which a positive locking element is mounted so that in all relative vertical positions between the apron and draw bar no uncoupling can take place except by manual operation when desired. At the same time, the locking element is so arranged that the coupling operations can be performed automatically by the mere interengagement of the apron and draw bar. Accordingly, I have provided a latching element on the draw bar with means thereon co-acting with the locking element to permit the apron to interengage with the draw bar and upon completion of this operation the co-action between the latching element and locking element is such as to positively prevent uncoupling of the apron from the draw bar except by manual actuation.

One of the main objects of this invention is to provide a draw bar rigidly secured to the platform of a drawn vehicle which will permit of automatic coupling.

Another object is to provide a positive locking mechanism for an apron of the coupler and which is carried by the draw bar.

A further object is to provide a locking element for an apron of a coupler which will permit automatic coupling and prevent uncoupling except by manual operation.

Another object is to provide a draw bar with novel latching and locking elements, the former controlling the condition of the latter in both coupling and uncoupling association.

A further object is to provide novel co-acting means between the latching and locking elements to perform the co-acting function.

Another object is to provide a draw bar of simple construction, housing the latching and locking elements, so that the draw bar is compact, yet durable and substantial for the purposes intended.

A further object is to provide novel latching and locking elements formed in such a manner as to be capable of juxtaposition relative to each other, co-acting with each other, and at the same time occupying a minimum amount of space so that both elements may be conveniently mounted within the draw bar and yet positively and easily perform the coupling function.

Other and further objects will appear from the following detailed description of a preferred embodiment of my invention illustrated in the accompanying drawings, in which:

Figure 1 is a top plan view of a coupler in accordance with my invention as applied to a drawing vehicle and a drawn vehicle with the parts in coupled relation, the platforms of the two adjacent vehicles being shown fragmentarily;

Figure 2 is a side view of the coupler, with the parts in coupled relation, as applied, being a side elevation of the parts shown in Figure 1;

Figure 3 is a vertical section taken along the line 3—3 of Figure 1;

Figure 4 is a perspective view of the draw bar;

Figure 5 is a perspective view of the latch element; and

Figure 6 is a perspective view of the locking element.

In the drawings, I have illustrated my coupler as applied to a drawing vehicle 11 and a drawn vehicle 12. The former may be a tractor while the latter, a trailer, or both may be trailers of a train of vehicles. A reinforcing angle bar 13 is secured to the platform of each and may extend around each. A U-shaped bracket 14 is riveted or otherwise suitably secured to the reinforcing angle bar 13 of vehicle 11. A coupling head 15 is pivotally mounted in brackets 14, for movement on a horizontal axis, by means of a pivot pin 16 passing through the ends of the arms of the bracket and through bearing eyes 17 of the head.

The coupling head comprises a depending apron 18 which includes a rectangular socket element 19 and wings 21 diverging outwardly from the side arms of the socket member. These wings define an inwardly converging passage for entrance of the draw bar, and also serve to prevent excessive lateral movement of the draw bar relative to the coupling head when the train of vehicles is in motion.

Wings 21 are connected at their outer ends, by a coupling element 22, which, in the form illustrated, is formed integrally with the wings and is arched or curved outwardly therefrom. This element extends across the entrance to the passage defined by the wings. Element 22 is of circular cross-section (see Figure 3) but this cross-section of the coupling element, though a preferred one, is not essential. The apron 18 and associated parts are disposed at one side of the axis of pin 16 and a counter weight 23 is disposed at the other side of such axis. This counter weight is connected to the wings of the apron by side arms 24 of substantially T-shaped cross-section, these arms being formed integrally with the apron, that is, with the wings 21 and with the counter-weight 23 and bearing eyes 17. Socket element 19 is connected to the counter weight 23 centrally thereof, by a web element 25. By this construction, the apron is an integral part of the head, the head being preferably cast as a unit. The counter-weight 23 is of proper value to counter-balance the apron and associated parts thus holding the head in substantially horizontal position. It will be noted that the coupling element 22 is arched outwardly away from the apron, thus facilitating coupling between two adjacent vehicles which may be disposed at a decided angular relation laterally of the coupling head.

It is also to be noted, as clearly illustrated in Figures 2 and 3, that the pin 16 is above the coupling element 22 so that pressure exerted on this element in the direction of vehicle 11 will tend to rock the apron and therefore element 22 downwardly about the pin 16.

The head 15 cooperates with a coupling tongue or draw bar 26, and a latch member 27 and lock member 28 mounted thereon. Draw bar 26 is provided with supporting flanges 29 riveted or otherwise suitably secured to the reinforcing angle bar 13 of vehicle 12. External reinforcing webs 31 are provided to strengthen the draw bar nose or tip 32 against lateral distortion and are integral with the side walls and supporting flanges. The body portion 33 of the draw bar extends downwardly in angular relation to the supporting portion and is hollow providing a space 34 defined by side walls 35 with a reinforcing web 36 extending forwardly for a short distance from the supporting portion across the space 34 in the plane of the reinforcing ribs 31 and integrally associated with the side walls 35. The nose 32 of the draw bar is of wedge shaped formation and extends horizontally from the body portion 33. The tip of the nose 32 has an integral bridging portion 37 which is convex on its upper side and has an upwardly extending convex rib 38 providing a camming surface 38'. An apron seat 39 extends rearwardly and horizontally between the rear face 41 of the bridging portion 37 and inwardly disposed lugs 42 formed integrally with the side walls 35, the forward faces 43 of which define the rear wall of the seat, the inner ends of the lugs being spaced apart, to permit of free vertical movement of the lock member 28 therebetween. Both the rear face 41 of the nose and the forward faces 43 of the lugs 42 are concave conforming to the outer surface of the apron member 22 when the latter is resting in the apron seat. The seat is of sufficient length to permit the apron 22 to have some longitudinal play therein.

The latch member 27 is provide with a bearing portion 44 and is retained in pivotal relation to the draw bar between the walls 35 adjacent the supporting portion by a pin 45 passing through the bearing portion 44 and walls 35. A spring 46 is coiled about one end of the bearing portion 44 and has one end 47 extending over the top edge of the latch member adjacent to the bearing portion with the other end 48 resting on the upper edge of the draw bar supporting portion adjacent one wall of the draw bar. This spring is adapted to normally project the latching member downwardly.

The forward end of the latching member is hollow providing a space defined by side walls 49 having a bridging portion 51 at the forward end thereof. The forward edges of the walls 49 of the latching member are convex downwardly forming camming portions 52, and the walls are cut away at 53 to form straight latching portions. An integral web portion 54 extends forwardly between the walls 49 to a point in proximity to the latching portion and has an angularly disposed front face 55. To facilitate uncoupling, hand hold portions 56 are provided in each side wall 49 adjacent the top edge of the latch member as well as recesses 57 which may be engaged by a hooked rod. A pin 58 passes through the side walls 49 adjacent the camming surfaces and latching portions thereof, and is suitably secured thereto. The purpose of the face 55 of web 54 and that of pin 58 will be hereinafter described.

Locking member 28 has a bearing portion 59 at its rear end, the forward end being provided with a slot 61 defined by forwardly extending upper and lower portions 62 and 63 respectively. The upper portion 62 projects forwardly of the open end of the slot 61 and is of concavo-convex formation, the lower edge being concave with the upper edge convex, forming a finger 64. The rear end of the concave edge is joined with the upper edge of slot 61, while the upper rear edge is joined with an angular shoulder 65.

The upper rear edge of the locking member is provided with a horizontal edge portion 66 extending rearwardly for a short distance at the end of which the upper edge of the locking member tapers to the upper periphery of the bearing portion 59. The lower edge of the locking member tapers downwardly and forwardly from the bearing portion 59 and the forward end thereof terminates in a shoulder 67 having a stop edge 68, the forward edge 69 of the lower portion 63 extending upwardly from the shoulder 67 and joining with the lower edge of the slot 61. The locking member is supported within the draw bar 26 for pivotal motion about its rear end by a pin 71 passing through the bearing 59 and the walls 35 of the draw bar at a point forwardly of the pivot of the latching member and below the webs 31 and web 36. The finger 64 projects into the space between the walls 49 and over the pin 58 of the latching member. In operative position, the upper edge of the slot 61 is adapted to rest on the uppermost portion of the cam rib 38.

The operation of the coupler is as follows:
When vehicle 11 is backed to be coupled with vehicle 12, the apron 22 may engage either the cam portion 52 of the latch member or the cam surface 38' of the rib 38. These cam surfaces will direct the apron member until the apron member abuts both the cam surfaces simultaneously. As vehicle 11 is backed further, the latch member will be cammed upwardly against the pressure of spring 46 until the pin 58 of the latch member engages the concave edge of the finger 64 of the locking member 28. It is to be noted that the pin 58 normally rests upon the cam surface 38' of the cam rib 38 with the finger of the locking member slightly spaced therefrom in normal inoperative position, so that by the time the pin 58 engages the concave edge of the finger 64 the angular shoulder 55 of the latch member 27 has been sufficiently raised to clear the co-acting shoulder 65 of the locking member. Upon continued rearward movement of the vehicle 11, the latch member is further raised and due to the engagement of the pin 58 with the lower edge of the finger 64 the locking member is raised with the latch member. When the apron 22 has passed the lowermost edge of the latching member, both the latching and locking members will be retained in elevated position by the engagement of the apron 22 with the lower concave edge of finger 64 due to the engagement of the web 54 and convex upper edge of the finger 64, until the apron member passes over the rear end of the cam surface 38' when the apron member will be directed downwardly by the pressure of spring 46 upon the latch member 27 and the lock member into the apron seat 39 of the drawbar. At this time the locking member 28 will drop to the position shown in Figures 2 and 3. The latching member 27 will assume the position shown in Figures 2 and 3, with the pin 58 resting upon the cam surface 38' of the cam web 38 and the shoulder 55 thereof in engagement with the shoulder 65 of the locking member. Inasmuch as the locking member 28 is pivoted at a point in advance of and under the pivotal point of the latching member 27, any upward thrust transmitted to the locking member by the engagement thereof with the apron 22, will be transmitted to the latching member in a line connecting the center of the pivot pin 45 and the inter-engaging shoulders 55 and 65 of the latching and locking members respectively. In other words, there will be a tendency on the part of the locking member to compress the metal of the web portion 54 of the latching member, so that accidental displacement of the locking member or the latching member by upward movement of the apron cannot take place until the latching member has been raised and the shoulders 55 and 65 disengaged to permit of free relative movement between the latching member and the locking member. Thus the apron 22 is positively secured in the apron seat 39 of the draw bar so that accidental uncoupling of the two vehicles cannot possibly take place.

In the uncoupling operation, when the latching member 27 is elevated against the pressure of spring 46 the pin 58 does not engage the lower concave edge of the finger 64 of the locking member until the shoulders 55 and 65 have been moved apart from each other. Upon continued elevation of the latching member 27, the pin 58 by engagement with the lower concave edge of the finger 64 of the locking member, thereby elevates the locking member. Upon still further elevating movement of the latching member 27 the lower edge of the slot 61 of the locking member engages the underside of the apron 22 and elevates it to a position above the upper edge of the cam surface 38' of the cam rib 38, so that the apron is now at liberty to move away from the draw bar. The upper edge 68 of the shoulder 67 by the engagement thereof with the under or lower edge of the bridging member 37, acts to stop further upward movement of the latching and locking elements when the apron member has been elevated sufficiently for purposes of release thereof from the draw bar. It will be evident that the uncoupling operation may be performed by the engagement of a hook member with the recesses or eyes 51 of the latching member.

Due to the pivotal mounting of the tongue member 15, and the relatively large span covered by the cam surface 52 and 38' of the latching member draw bar respectively, the coupling function may be accomplished with the vehicles in vertical disalignment thereof.

It will be evident from the foregoing that I have provided a simple and efficient coupler of substantial and durable construction, in which the coupling function may be automatically accomplished without requiring a prior setting of either the tongue or the draw bar. By the provision of the novel latching and locking element, I have provided a coupler in which uncoupling cannot accidentally take place due to vertical disalignment of the vehicles and consequent upward pull exerted by the apron. It will be also evident that owing to the small number of parts employed in the coupler construction, the coupling and uncoupling functions may both be accomplished quickly, readily, and positively.

As will be understood by those skilled in the art, any suitable means may be employed on either the drawing vehicle or the drawn vehicle to elevate the latching element to perform the uncoupling function.

While I have shown a preferred embodiment of my invention, it is to be understood that I do not wish to limit myself thereto. Certain changes may be made therein without departing from the essence of the invention and the spirit and scope of the appended claims. What I claim and desire to secure by Letters Patent, is:

1. The combination with a coupling means having a coupling element and a draw bar adapted to be engaged by said coupling element, of a latch means and lock means on said draw bar for positively retaining said coupling element on said draw bar, and a lost motion means for releasing said lock means and disengaging said draw bar by the lock means.

2. The combination with a coupling means having a coupling element and a draw bar having a seat adapted to be engaged by said coupling means, of movable latch means and lock means on said draw bar, means on said lock means for moving said coupling element out of said seat when the lock means is moved to uncoupling position, and a lost motion connection between said two means, said movement of the lock means being effected through said lost motion connection by movement of the latch means.

3. The combination with a coupling means having a coupling element and a draw bar adapted to be engaged by said coupling element, of latch means and lock means adapted to move across the path of said coupling element, said latch means and lock means having inter-engaging means thereon to positively retain said lock means in coupling position, and a connection between said latch means and lock means whereby the inter-engaging means is first disengaged and the lock means subsequently operated by said latch means.

4. A draw bar having a seat adapted to be engaged by a coupling member, cam means on said draw bar adapted to be engaged by said coupling member, latch means adapted to be engaged by said coupling member, lock means adapted to positively retain said coupling element in said seat, and a lost motion connection between said latch means and said lock means.

5. The combination with two adjacent vehicles, one of said vehicles having a pivoted coupling apron including a coupling member and the other of said vehicle having a rigid draw bar having a seat adapted to be engaged by said coupling member, of latch means pivoted on said draw bar and adapted to swing across the path of said coupling member, lock means on said draw bar adapted to move across the path of said coupling member, and means adapted to normally seat said coupling member in said seat.

6. The combination with two adjacent vehicles, of a pivoted apron including a coupling member on one of said vehicles, a rigid draw bar having a cam nose and a seat adapted to be consecutively engaged by said coupling member on the other of said vehicles, latch means having a cam portion thereon and lock means on said draw bar adapted to be consecutively engaged by said coupling member, means normally projecting said latch means to coupling position, the cam means on the draw bar nose and on said latch means permitting of automatic coupling of said coupling member and draw bar, and inter-engaging means on said latch means and lock means to positively retain the lock means in coupling position thereby preventing unseating of said coupling member from said draw bar.

7. The combination with two adjacent vehicles, of a pivoted apron including a coupling member on one of said vehicles, a rigid draw bar having a cam nose and a seat adapted to be consecutively engaged by said coupling member on the other of said vehicles, latch means having a cam portion thereon and lock means on said draw bar adapted to be consecutively engaged by said coupling member, means normally projecting said latch means to coupling position, the cam means on the draw bar nose and on said latch means permitting of automatic coupling of said coupling member and draw bar, inter-engaging means on said latch means and lock means to positively retain the lock means in coupling position thereby preventing the unseating of said coupling member from said draw bar, a lost motion connection between said latch means and lock means whereby in uncoupling operation said latch means will be first moved to disengage said inter-engaging means, and means on said lock means to unseat said coupling member when the latch means and lock means are manually operated to uncoupling position.

8. The combination with two adjacent vehicles, of a pivoted apron including a coupling member on one of said vehicles, a rigid draw bar having a cam nose and a seat adapted to be consecutively engaged by said coupling member on the other of said vehicles, latch means having a cam portion thereon and lock means on said draw bar adapted to be consecutively engaged by said coupling member, means normally projecting said latch means to coupling position, the cam means on the draw bar nose and on said latch means permitting of automatic coupling of said coupling member and draw bar, inter-engaging means on said latch means and lock means to positively retain the lock means in coupling position thereby preventing the unseating of said coupling member from said draw bar, and means on said lock means to unseat said coupling member when the latch means and lock means are manually operated to uncoupling position.

9. The combination with a coupling means having a coupling element and a draw bar adapted to be engaged by said coupling element, of latch means and lock means adapted to move across the path of said coupling element, said latch means and lock means having inter-engaging means thereon to positively retain said lock means in coupling position, a connection between said latch means and lock means whereby the inter-engaging means is first disengaged and the lock means subsequently operated by said latch means, and means associated with one of said latch means and lock means adapted to move said coupling element out of engagement with said draw bar.

10. The combination with two adjacent vehicles, of a coupling element carried by one of said vehicles, a draw bar including a seat carried by the other of said vehicles, latch means pivoted on said draw bar, cam means on said draw bar and latch means cooperating to guide said coupling elements to said seat, lock means on said draw bar, said latch and lock means having cooperating shoulders to retain said coupling element in said seat, and a lost motion connection between said latch and lock means whereby said cooperating shoulders are first disengaged prior to operation of said lock means in both coupling and uncoupling operations.

11. The combination with two adjacent vehicles, of a coupling element carried by one of said vehicles, a draw bar including a seat carried by the other of said vehicles, latch means pivoted on said draw bar, cam means on said draw bar and latch means cooperating to guide said coupling elements to said seat, lock means on said draw bar, said latch and lock means having cooperating shoulders to retain said coupling element in said seat, and a lost motion connection between said latch and lock means whereby said cooperating shoulders are first disengaged prior to operation of said lock means in both coupling and uncoupling operations, said lock means including means for ejecting said coupling element from said seat in uncoupling operation.

12. The combination with two adjacent vehicles, of a coupling element associated with one of said vehicles, a draw bar having a seat associated with the other of said vehicles, latch means carried by said draw bar, and lock means carried by said draw bar, said coupling elements being adapted to be automatically guided into said seat by successive engagement of said latch means and lock means, the draft force being transmitted through said seat exclusive of either of said means.

13. The combination with a coupling means having a coupling element and a draw bar adapted to be engaged by said coupling element, of a latch means and lock means on said draw bar for positively retaining said coupling element on said draw bar, said latch means and lock means each being adapted for movement, and a lost motion connection between the latch and lock means for releasing the lock means and disengaging the draw bar by said lock means upon movement of the latch means.

14. The combination with a coupling means having a coupling element and a draw bar adapted to be engaged by said coupling element, of a latch means and lock means on said draw bar for positively retaining said coupling element on said draw bar, said latch and lock means each being adapted for movement, and a lost motion connection between the latch means and lock means whereby upon movement of the latch means to a certain point the lock means is released without moving the lock means by virtue of said connection and upon further movement of the latch means the lock means is moved thereby through said connection, said movement of the lock means through said connection effecting disengagement of the draw bar directly by the lock means.

In witness whereof, I hereunto subscribe my name this 18 day of Sept., 1929.

WALTER C. YEAKEL.